US012577005B2

(12) United States Patent
Ghiotti et al.

(10) Patent No.: US 12,577,005 B2
(45) Date of Patent: Mar. 17, 2026

(54) MACHINE AND METHOD TO MANUFACTURE TUBULAR ELEMENTS WITH THE SHAPE OF A TRUNCATED CONE, IN PARTICULAR, OF THE TOBACCO INDUSTRY

(71) Applicant: SASIB S.P.A., Castel Maggiore (IT)

(72) Inventors: Roberto Ghiotti, Monte S. Pietro (IT); Enrico Manfredi, Bologna (IT); Yuri Negrini, Bologna (IT)

(73) Assignee: SASIB S.P.A., Castel Maggiore (IT)

( * ) Notice: Subject to any disclaimer, the term of this patent is extended or adjusted under 35 U.S.C. 154(b) by 23 days.

(21) Appl. No.: 18/580,993

(22) PCT Filed: Jul. 21, 2022

(86) PCT No.: PCT/IB2022/056732
§ 371 (c)(1),
(2) Date: Jan. 19, 2024

(87) PCT Pub. No.: WO2023/002422
PCT Pub. Date: Jan. 26, 2023

(65) Prior Publication Data
US 2024/0351719 A1 Oct. 24, 2024

(30) Foreign Application Priority Data

Jul. 22, 2021 (IT) ........................ 102021000019427

(51) Int. Cl.
B65B 19/04 (2006.01)
B65B 19/12 (2006.01)
B65G 15/30 (2006.01)
(52) U.S. Cl.
CPC .............. *B65B 19/04* (2013.01); *B65B 19/12* (2013.01); *B65G 15/30* (2013.01)

(58) Field of Classification Search
CPC .......... B65B 19/04; B65B 19/12; B65G 15/30
See application file for complete search history.

(56) References Cited

U.S. PATENT DOCUMENTS

| 3,278,077 | A | * | 10/1966 | Schmermund | .......... B65B 19/04 |
| | | | | | 221/124 |
| 3,472,403 | A | * | 10/1969 | Byrd | ....................... B65B 43/44 |
| | | | | | 221/221 |
| 3,520,394 | A | * | 7/1970 | Ariosto | ................... B65B 19/32 |
| | | | | | 53/151 |

(Continued)

FOREIGN PATENT DOCUMENTS

| DE | 19581515 T1 | 2/1997 |
| GB | 2290514 A | 1/1996 |

(Continued)

OTHER PUBLICATIONS

International Application No. PCT/IB2022/056732, International Search Report and Written Opinion, mailed Feb. 14, 2023.

*Primary Examiner* — Thomas M Wittenschlaeger
*Assistant Examiner* — Katie L Gerth
(74) *Attorney, Agent, or Firm* — MARSHALL, GERSTEIN & BORUN LLP

(57) ABSTRACT
There are described a method and machine for manufacturing truncated-cone shaped tubular elements. The machine comprises: a conveyor provided with a number of first seats, each for a tubular element, divided into sets with a predetermined number of first seats; a first insertion station in which the tubular elements housed inside the first seats of a set are transferred simultaneously inside the respective second seats of a loader; a packing conveyor which moves tubular packs along a packing path; and a second insertion station of the tubular elements which are transferred from the loader to the tubular pack, wherein the loader is movable from the first insertion station to the second insertion station arranged along the packing path.

20 Claims, 13 Drawing Sheets

(56)  References Cited

U.S. PATENT DOCUMENTS

| | | | | |
|---|---|---|---|---|
| 3,771,279 | A * | 11/1973 | Seragnoli | B65B 19/10 |
| | | | | 53/151 |
| 3,917,049 | A * | 11/1975 | Shirai | B65B 19/04 |
| | | | | 53/151 |
| 5,426,921 | A | 6/1995 | Beckmann | |
| 5,524,414 | A * | 6/1996 | Spada | B65B 19/32 |
| | | | | 209/535 |
| 5,548,941 | A * | 8/1996 | Portaro | B65B 19/04 |
| | | | | 53/151 |
| 5,743,067 | A | 4/1998 | Trimani | |
| 5,996,310 | A | 12/1999 | Bailey et al. | |
| 6,213,284 | B1 | 4/2001 | Spatafora | |
| 6,397,567 | B1 * | 6/2002 | Focke | B65B 35/52 |
| | | | | 53/541 |
| 6,612,094 | B1 * | 9/2003 | Bailey | B65B 5/024 |
| | | | | 53/563 |
| 7,134,257 | B2 * | 11/2006 | Focke | B65B 19/245 |
| | | | | 53/449 |
| 7,165,668 | B2 * | 1/2007 | Dombek | A24C 5/326 |
| | | | | 198/474.1 |
| 10,842,183 | B2 * | 11/2020 | Rutkowski | B65G 47/248 |
| 12,233,619 | B2 * | 2/2025 | Ghiotti | A24C 5/465 |
| 2002/0020606 | A1 * | 2/2002 | Spatafora | B65B 19/32 |
| | | | | 198/418 |
| 2004/0104240 | A1 * | 6/2004 | Spatafora | A24C 5/325 |
| | | | | 221/289 |
| 2005/0077148 | A1 * | 4/2005 | Dombek | A24C 5/326 |
| | | | | 198/377.08 |
| 2005/0082141 | A1 * | 4/2005 | Dombek | A24C 5/326 |
| | | | | 198/474.1 |
| 2020/0245673 | A1 * | 8/2020 | Rutkowski | B65G 47/84 |
| 2021/0016908 | A1 * | 1/2021 | Yanchev | B65B 19/10 |
| 2024/0246708 | A1 * | 7/2024 | Ghiotti | B65B 35/40 |

FOREIGN PATENT DOCUMENTS

| | | | |
|---|---|---|---|
| WO | WO-95/21771 | A1 | 8/1995 |
| WO | WO-2020035824 | A1 | 2/2020 |

* cited by examiner

MACHINE AND METHOD TO MANUFACTURE TUBULAR ELEMENTS WITH THE SHAPE OF A TRUNCATED CONE, IN PARTICULAR, OF THE TOBACCO INDUSTRY

CROSS-REFERENCE TO RELATED APPLICATIONS

This Patent Application is a U.S. national stage of International Patent Application No. PCT/IB2022/056745, filed Jul. 21, 2022, and claims priority from Italian Patent Application No. 102021000019427 filed on Jul. 22, 2021, the entire disclosure of which is incorporated herein by reference.

TECHNICAL FIELD

The present invention relates to a machine and to a method to manufacture tubular elements with the shape of a truncated-cone.

The present invention can be advantageously applied in the manufacture of tubular elements with the shape of a truncated-cone provided at one end with a filter. These tubular elements can subsequently be used to create a cigarette by filling the tubular element with tobacco.

PRIOR ART

Recently, truncated-cone shaped tubular elements, partially empty and provided at one end with a filter, which are used to create a cigarette by hand, have been proposed on the market of articles for smoking; in particular, a user no longer requires to manually roll a paper (lengthy and complex operation which requires a certain dexterity to obtain a result of even only acceptable quality), but only requires to fill a preformed tubular element with tobacco through the open end.

These tubular elements are sold in rows of tubular elements inserted one inside the other.

However, the manufacture of these truncated-cone shaped tubular elements is currently carried out by hand: the rows of tubular elements inserted one inside the other are made by hand and these rows are then arranged inside a pack by hand. However, manual manufacturing has very high production costs, does not allow high volumes to be obtained and the quality of the end product varies greatly and on average is not very high.

DESCRIPTION OF THE INVENTION

The object of the present invention is to provide a manufacturing machine and a manufacturing method of truncated-cone shaped tubular elements, in particular for the tobacco industry, said manufacturing machine and manufacturing method allowing high productivities to be reached while guaranteeing high quality standards and, at the same time, being easy and inexpensive to implement.

In accordance with the present invention, there are provided a manufacturing machine and a manufacturing method of tubular elements, in particular for the tobacco industry, as claimed in the appended claims.

The claims describe preferred embodiments of the present invention forming an integral part of the present description.

BRIEF DESCRIPTION OF THE DRAWINGS

The present invention will now be described with reference to the accompanying drawings, which illustrate a non-limiting example of embodiment, wherein.

PREFERRED EMBODIMENTS OF THE INVENTION

Figure 1:
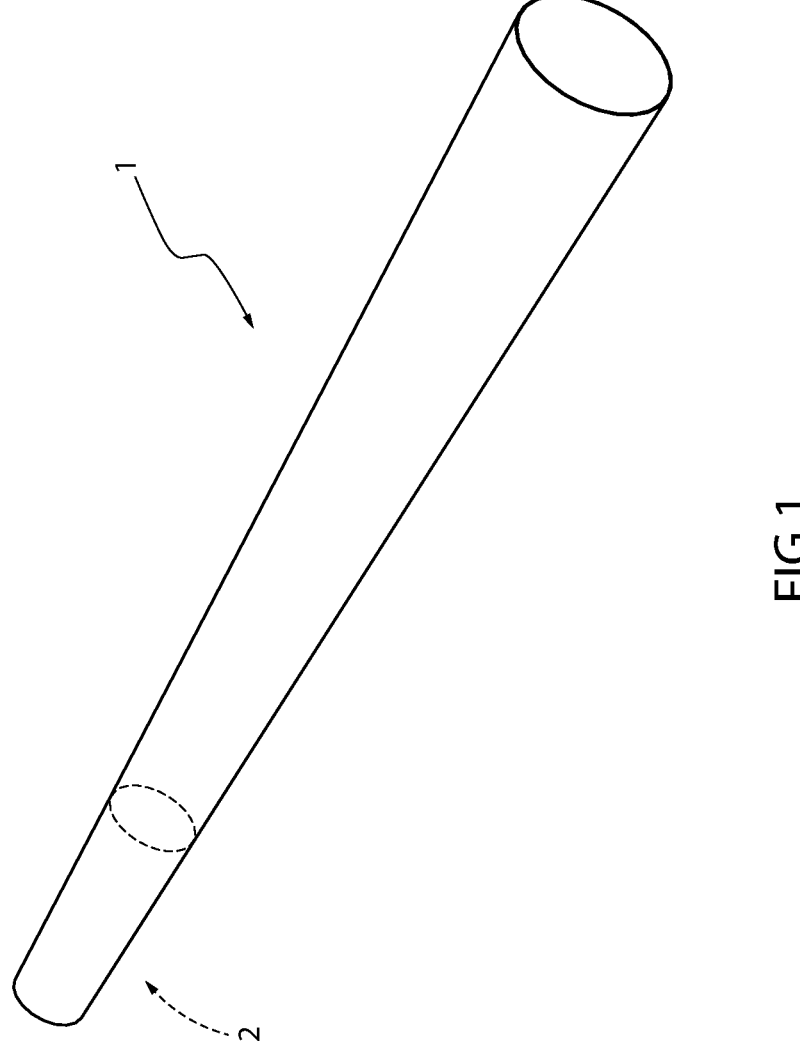
FIG. 1 is a perspective view of a truncated-cone shaped tubular element designed to produce a cigarette.

In FIG. 1 the number 1 indicates as a whole a tubular elements with the shape of a truncated-cone, partially empty and provided at one end (narrower) with a filter 2. The tubular element 1 is designed for creating a cigarette by hand, which is filled by a user by inserting tobacco through the open end.

Figure 2:
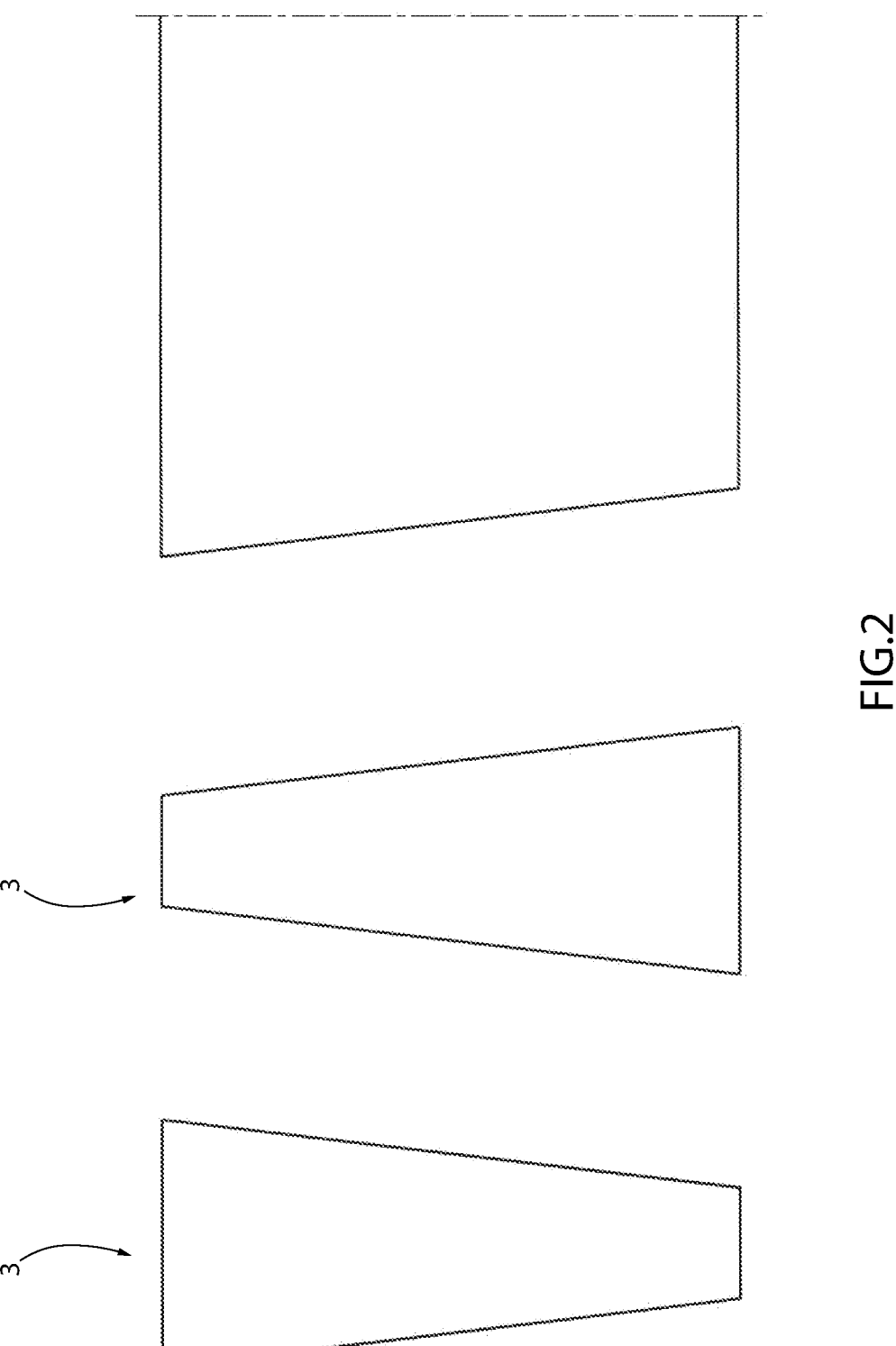
FIG. 2 is a plan view of wrapping sheets used to produce the tubular element of FIG. 1.

The tubular element 1 consists of a trapezoidal shaped wrapping sheet 3 (illustrated laid flat in FIG. 2) that is wound in a tube around itself to take one end to overlap the other end; in particular, a vinyl based permanent glue is interposed between the two overlapped ends to hold them joined together, stabilizing the tubular fold of the wrapping sheet 3.

Figure 3:
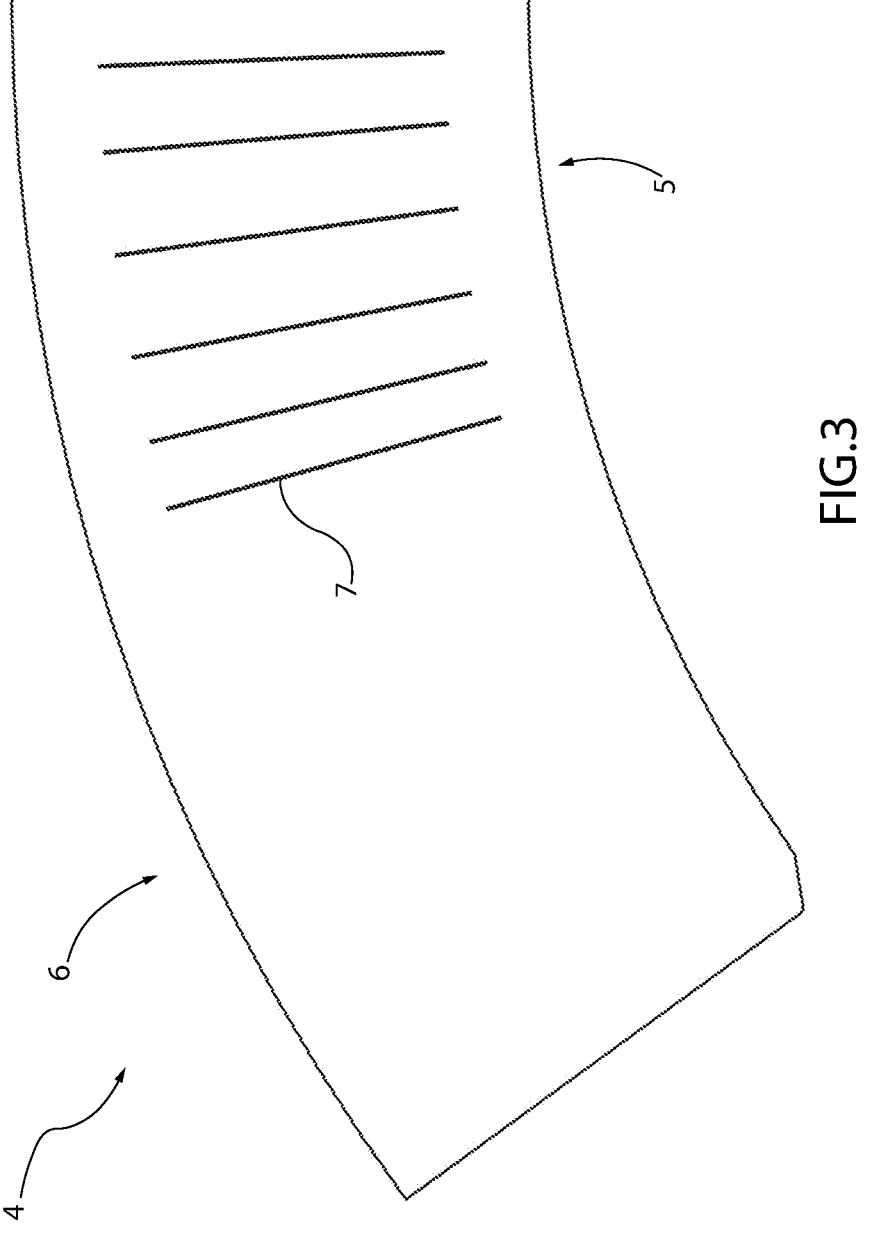
FIG. 3 is a plan view of a sheet of flat card used to produce a filter of the tubular element of FIG. 1.
Figure 4:
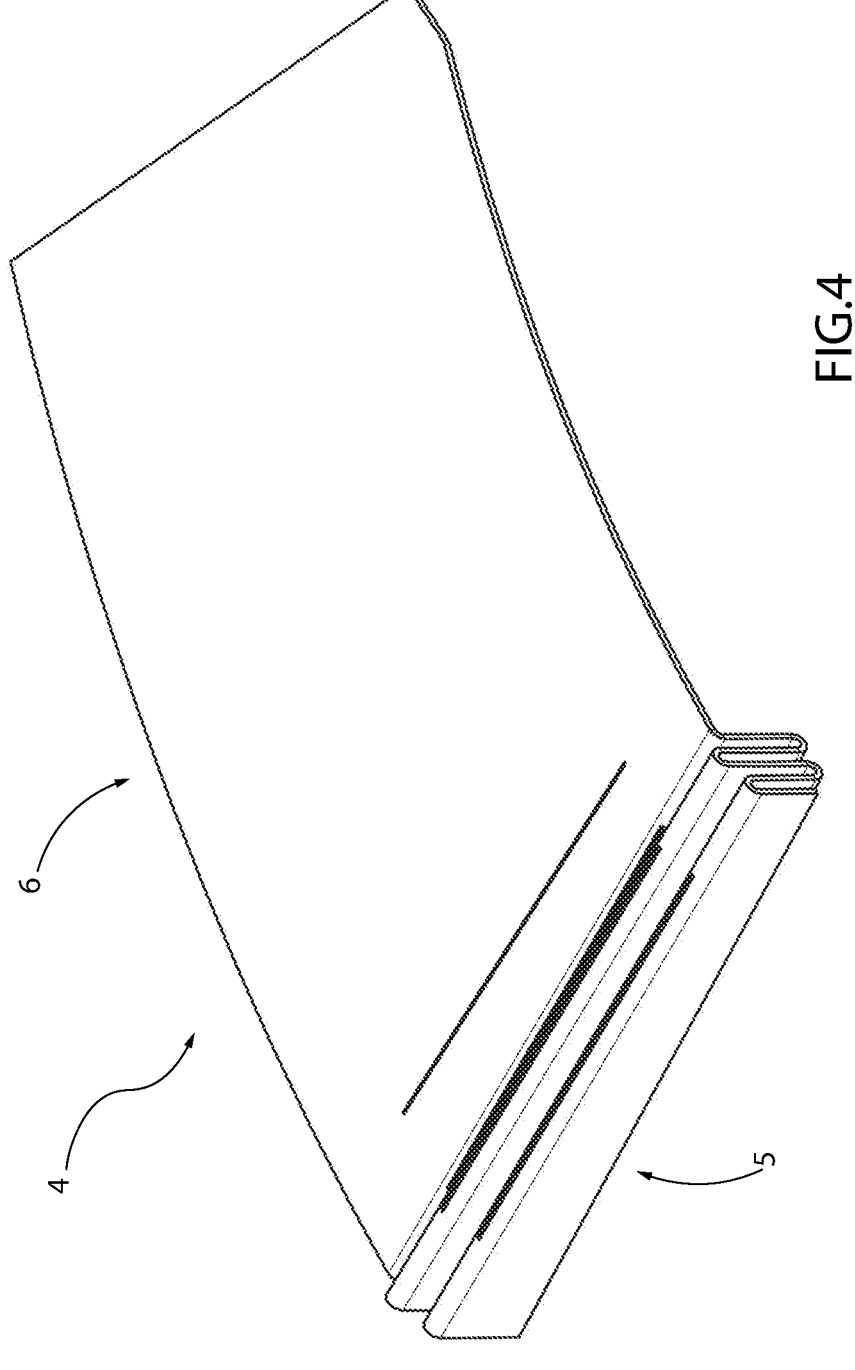
FIG. 4 is a perspective view of the tubular element of FIG. 3 partially folded over itself.

According to a possible (but not binding) embodiment illustrated in FIGS. 3 and 4, the filter 2 is formed by folding a sheet 4 of card (having a much higher grammage with respect to the wrapping sheet 3) over itself. In particular, the sheet 4 comprises an inner portion 5 that has a series of pre-weakened fold lines 7 and is folded in a concertina, or bellows, fashion, (as illustrated in FIG. 4) along the pre-weakened fold lines 7 to form an inner body of the filter 2; moreover, the sheet 4 comprises an outer portion 6, which is contiguous to the inner portion 5 and is folded in a tube around the inner body formed by the inner portion 5 folded in a concertina fashion (as illustrated in FIG. 4) to form an outer casing of the filter 2.

Figure 5:
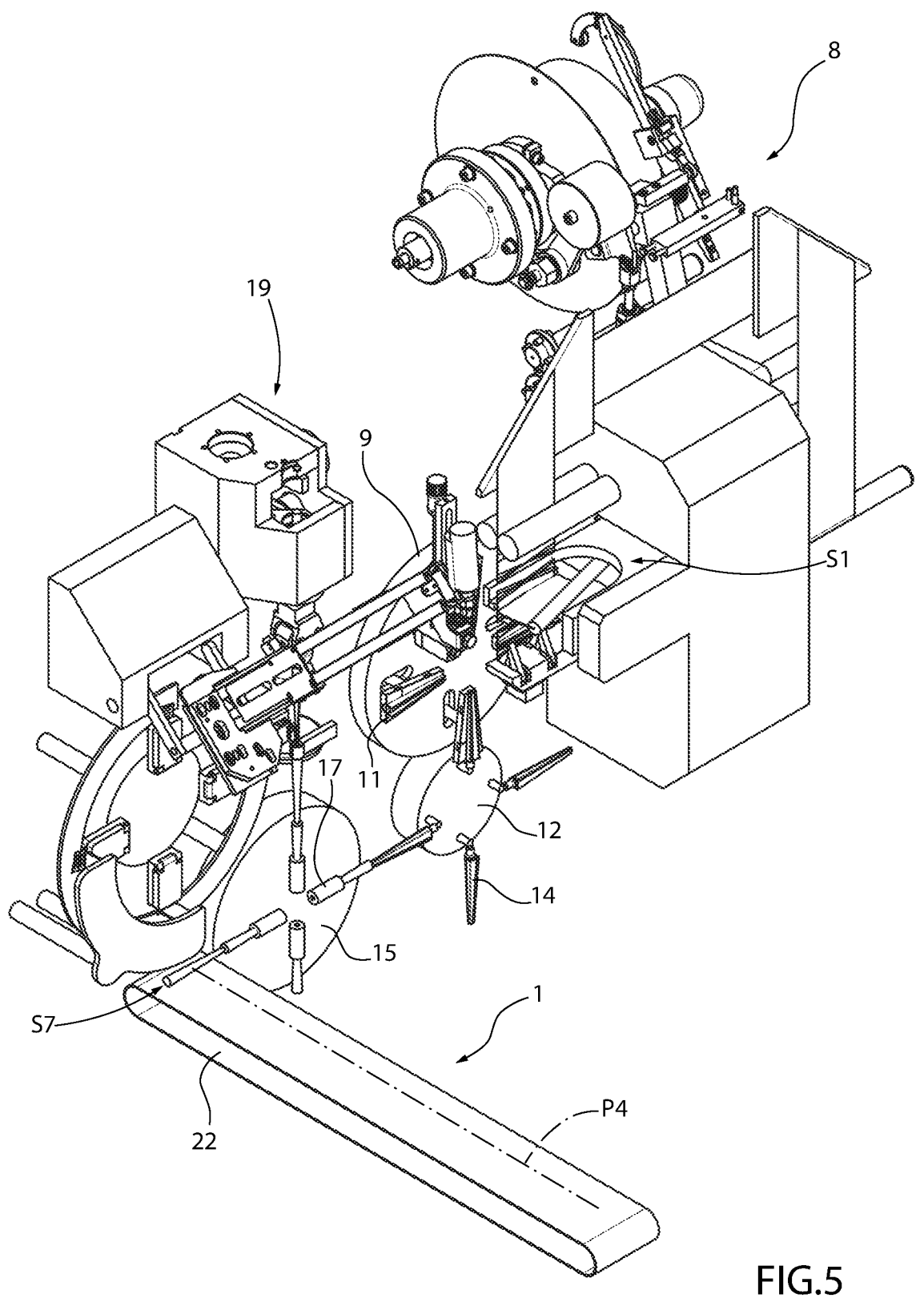
FIG. 5 is a perspective view and with parts removed for clarity of a first portion of the machine of the present invention which produces the tubular element of FIG. 1.
Figure 6:
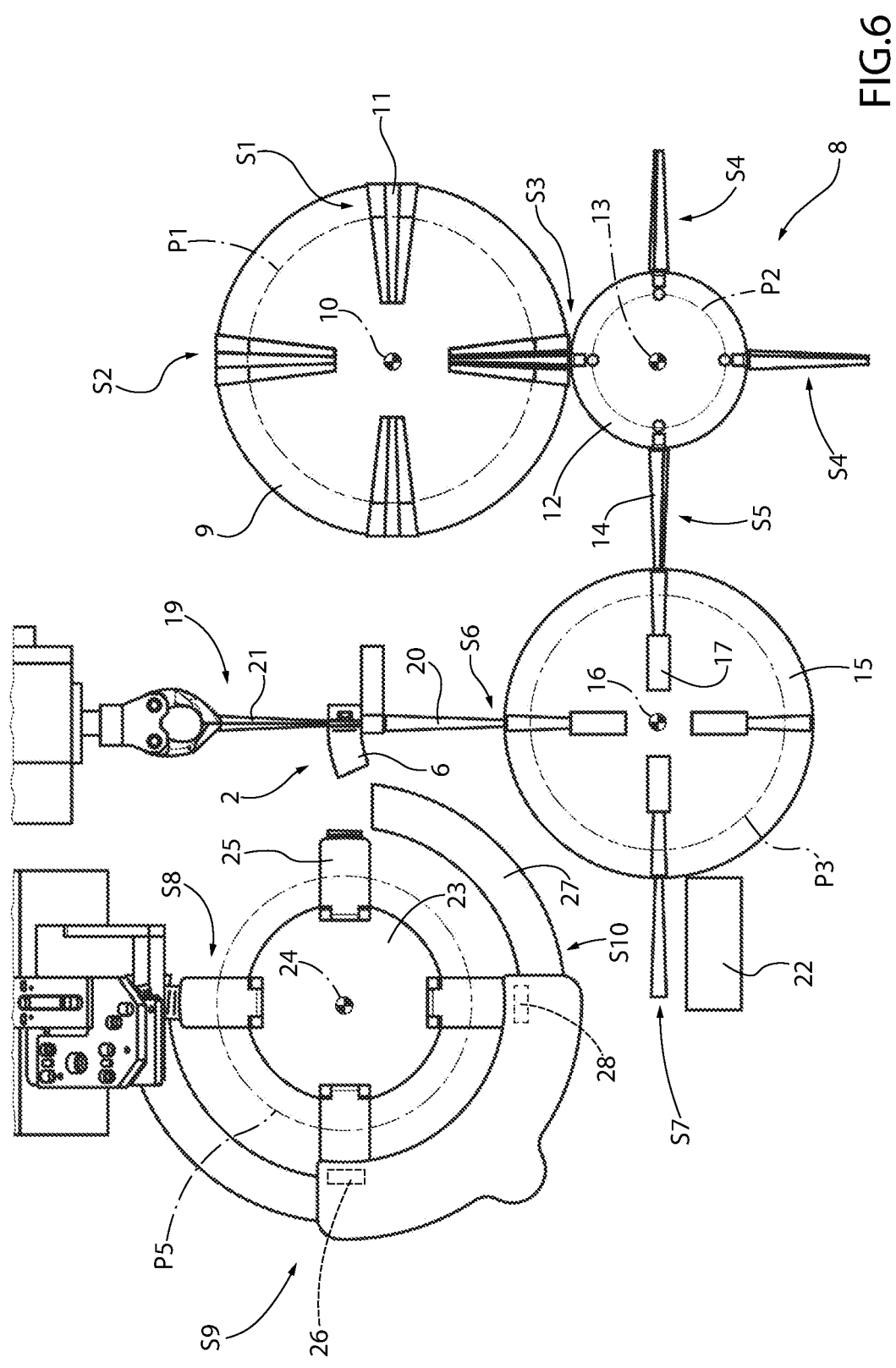
FIG. 6 is a front view of the portion of the machine of FIG. 5.

In FIGS. 5 and 6, the number 8 indicates as a whole a manufacturing machine (only partially illustrated) for producing the tubular elements 1 described above. The manufacturing machine 8 has an intermittent movement, i.e., its conveyors cyclically alternate moving phases with stationary phases.

The manufacturing machine 8 comprises an input drum 9 which is arranged vertically and is mounted rotating in steps around a horizontal rotation axis 10 (perpendicular to the plane of FIG. 6); in other words, the input drum 9 is rotated with an intermittent movement, i.e., a non-continuous movement having a cyclic alternation of moving phases, in which the input drum 9 is in movement, and stationary phases, in which the input drum 9 stops. The input drum 9 supports four pockets 11, each of which is designed to receive a corresponding wrapping sheet 3; according to a different embodiment, not illustrated, the input drum 9 supports a different number of pockets 11, for example three, five, six, eight . . . pockets 11.

As illustrated in FIG. 6, the rotation of the input drum 9 around the rotation axis 10 cyclically moves each pocket 11 along a circular input path P1 that passes through: a feeding station S1 in which the pocket 11 receives a wrapping sheet 3, a gumming station S2 in which the wrapping sheet 3 carried by the pocket 11 is gummed (i.e., is provided with glue), and a transfer station S3 in which the wrapping sheet 3 is transferred and leaves the pocket 11.

The manufacturing machine 8 comprises a wrapping drum 12 which is arranged vertically and is mounted rotating in steps around a horizontal rotation axis 13 (parallel to the rotation axis 9); in other words, the wrapping drum 12 is rotated with an intermittent movement, i.e., a non-continuous movement having cyclic alternation of moving phases, in which the wrapping drum 12 is in movement, and of stationary phases, in which the wrapping drum 12 stops. The wrapping drum 12 supports four spindles 14, each of which has the shape of the inner cavity of the tubular elements 1 and is designed to receive a corresponding wrapping sheet 3 which winds in a tube around said spindle 14; according to a different embodiment, not illustrated, the wrapping drum 12 supports a different number of spindles 14, for example three, five, six, eight . . . spindles 14.

Each spindle 14 is designed to retain a corresponding wrapping sheet 3 by means of suction; i.e., an outer wall of each spindle 14 has a plurality of small holes which can be connected to a suction source to retain a corresponding wrapping sheet 3 and can optionally be connected to a compressed air source to move a corresponding wrapping sheet 3 away. According to a possible embodiment, the small holes of each spindle 14 are inclined towards the smaller base of the spindle 14 (i.e., towards the narrower end of the spindle 14); in this way, when the small holes of each spindle 14 are supplied with compressed air they also generate an axial thrust, which tends (helps) to extract a tubular element 1 from the spindle 14.

The rotation of the wrapping drum 12 around the rotation axis 13 cyclically moves each spindle 14 along a circular wrapping path P2 that passes through: the transfer station S3 in which the spindle 14 receives from a pocket 11 of the input drum 9 a wrapping sheet 3, which winds in a tube around the spindle 14, two stabilizing stations S4 in which the glue applied to the wrapping sheet 3 takes hold stabilizing the tubular shape of the wrapping sheet 3, and a transfer station S5 in which the tubular wrapping sheet 3 is transferred and leaves the spindle 14.

The manufacturing machine 8 comprises an insertion drum 15 which is arranged vertically and is mounted rotating in steps around a horizontal rotation axis 16 (parallel to the rotation axis 10); in other words, the insertion drum 15 is rotated with an intermittent movement, i.e., a non-continuous movement with cyclic alternation of moving phases, in which the insertion drum 15 is in movement, and stationary phases, in which the insertion drum 15 stops. The insertion drum 15 supports four pockets 17, each of which has a tubular shape and is provided internally with a truncated-cone shaped seat 18, which reproduces in negative the shape of the tubular elements 1 and is designed to receive a corresponding tubular element 1; according to a different embodiment, not illustrated, the insertion drum 15 supports a different number of pockets 17, for example three, five, six, eight . . . pockets 17.

Each pocket 17 is designed to retain a corresponding tubular element 1 by means of suction; i.e., an inner wall of each pocket 17 (which delimits the seat 18) has a plurality of small holes which can be connected to a suction source to retain a corresponding tubular element 1 and can be connected to a compressed air source to move a corresponding tubular element 1 away. According to a possible embodiment, the small holes of each pocket 17 are inclined towards the larger base of the seat 18 (i.e., towards the wider end of the seat 18); in this way, when the small holes of each pocket 17 are supplied with compressed air they also generate an axial thrust that tends (helps) to extract a tubular element 1 from the pocket 17. Each pocket 17 is mounted moving on the insertion drum 15 to translate radially, with respect to the insertion drum 15, between an expanded exchange position in which the pocket 17 receives and transfers a corresponding tubular element 1 and a contracted movement position; in particular, in the exchange position each pocket 17 is (radially) farther from the centre of the insertion drum 15 while in the movement position each pocket 17 is (radially) closer to the centre of the insertion drum 15. Preferably all the pockets 17 translate radially always together and in the same way, i.e., all the pockets 17 carry out the same radial translation synchronously. The movement of the pockets 17 with respect to the insertion drum 15 is generated by an actuator that uses fixed cams arranged inside the insertion drum 15 and/or electric motors carried by the insertion drum 15.

The rotation of the insertion drum 15 around the rotation axis 16 cyclically moves each pocket 17 along a circular insertion path P3 that passes through: the transfer station S5 in which the pocket 17 receives a tubular element 1 from a spindle 14, an insertion station S6 in which a filter 2 is inserted inside the tubular element 1, and a transfer station S7 in which the tubular element 1 is transferred and leaves the pocket 17.

In the insertion station S6 there is arranged an insertion device 19, which is designed to insert a filter 2 inside a tubular element 1 carried by a pocket 17 in substance stationary at the insertion station S6. The insertion device 19 comprises a truncated-cone shaped tubular insertion body 20 which is designed to be inserted inside a tubular element 1 and thus to receive internally a filter 2, which is pushed along the whole of the insertion body 20 until it exits from the insertion body 20 and is driven inside the tubular element 1 that surrounds the insertion body 20. In other words, the insertion body 20 is arranged inside the tubular element 1 so that a wider (larger) input end of the insertion body 20 is arranged at the wider (larger) end of the tubular element 1 and so that a narrower (smaller) output end of the insertion body 20 is arranged inside the tubular element 1 and close to the narrower (smaller) end of the tubular element 1 (i.e., where the filter 2 is to be positioned). Once the insertion body 20 has been arranged inside the tubular element 1, the filter 2 is pushed along the whole of the insertion body 20 entering from the wider (larger) input end of the insertion body 20 and exiting from the narrower (smaller) output end of the insertion body 20: when the filter exits from the narrower (smaller) output end of the insertion body 20 it is inside the tubular element 1 in its final position and expanding through spring-back (as it is no longer radially compressed by the insertion body 20) it is positioned (permanently) through interference inside the tubular element 1.

The insertion device 19 comprises a (rotating) pusher 21 that pushes the filter 2 along the whole of the insertion body 20 entering from the wider (larger) input end of the insertion body 20 and exiting from the narrower (smaller) output end of the insertion body 20. In accordance with a further embodiment, the pusher 21 could enter from the wider (larger) input end of the insertion body 20 and reach the narrower (smaller) output end of the insertion body 20; in other words, in this embodiment only the filter 2 exits from the insertion body 4.

The manufacturing machine 8 comprises a linear transport conveyor 22, which receives the tubular elements 1 provided with the filters 2 in the transfer station S7 from the pockets 17 and moves the tubular elements 1 provided with the filters 2 along a linear output path P4.

Finally, the manufacturing machine 8 comprises a folding drum 23, which is arranged vertically and is mounted rotating in steps around a horizontal rotation axis 24 (parallel to the rotation axis 16); in other words, the folding drum 23 is rotated with an intermittent movement, i.e., a non-continuous movement having a cyclic alternation of moving phases, in which the folding drum 23 is in movement, and stationary phases, in which the folding drum 23 stops. The folding drum 23 supports four pockets 25, each of which is designed to receive a corresponding sheet 3 of card; according to a different embodiment, not illustrated, the folding drum 23 supports a different number of pockets 25, for example three, five, six, eight . . . pockets 25.

The rotation of the folding drum 23 around the rotation axis 10 cyclically moves each pocket 25 along a circular folding path P5 that passes through: a feeding station S8 in which the pocket 25 receives a sheet 4 of card, a folding station S9 in which a moving folding element 26 locally makes a V-shaped fold in an intermediate zone of the inner portion 5 of the sheet 4 of card (to produce the first "V" of the concertina) pushing on a corresponding fold line 7 and coacting with a fixed locator (guide) 27, a folding station S10 in which a moving folding element 28 (twin of the moving folding element 26) locally makes a V-shaped fold in an intermediate zone of the cardboard sheet 4 (to produce the second "V" of the concertina), coacting with the fixed locator, and the insertion station S6 in which the filter 2 being formed (i.e., the sheet 4 of card with the inner portion 5 folded in a concertina fashion) is transferred to the pusher 21.

With reference to the accompanying figures, there is described below a manufacturing machine (and a manufacturing method) of the aforesaid truncated-cone shaped tubular elements, the machine (and the method) being the subject matter of the present invention.

With reference to the machine 8 illustrated in the accompanying figures, the manufacturing machine 8 comprises a first machine part (described above) that produces the tubular element 1 and a second machine part (which will be described below) that arranges these tubular elements 1 in packs. This embodiment of the machine 8 is particularly advantageous as it does not require storage of the tubular elements 1 between the first machine part and the second machine part. In fact, as the tubular elements 1 are delicate and difficult to handle, storing them would be complicated.

According to an alternative embodiment (not illustrated), the tubular elements 1 produced by the first part of the machine 8 described above can be stored in trays or buffers. In this case, the manufacturing machine of the present invention receives the tubular elements 1 from said trays or buffers.

Figure 7:
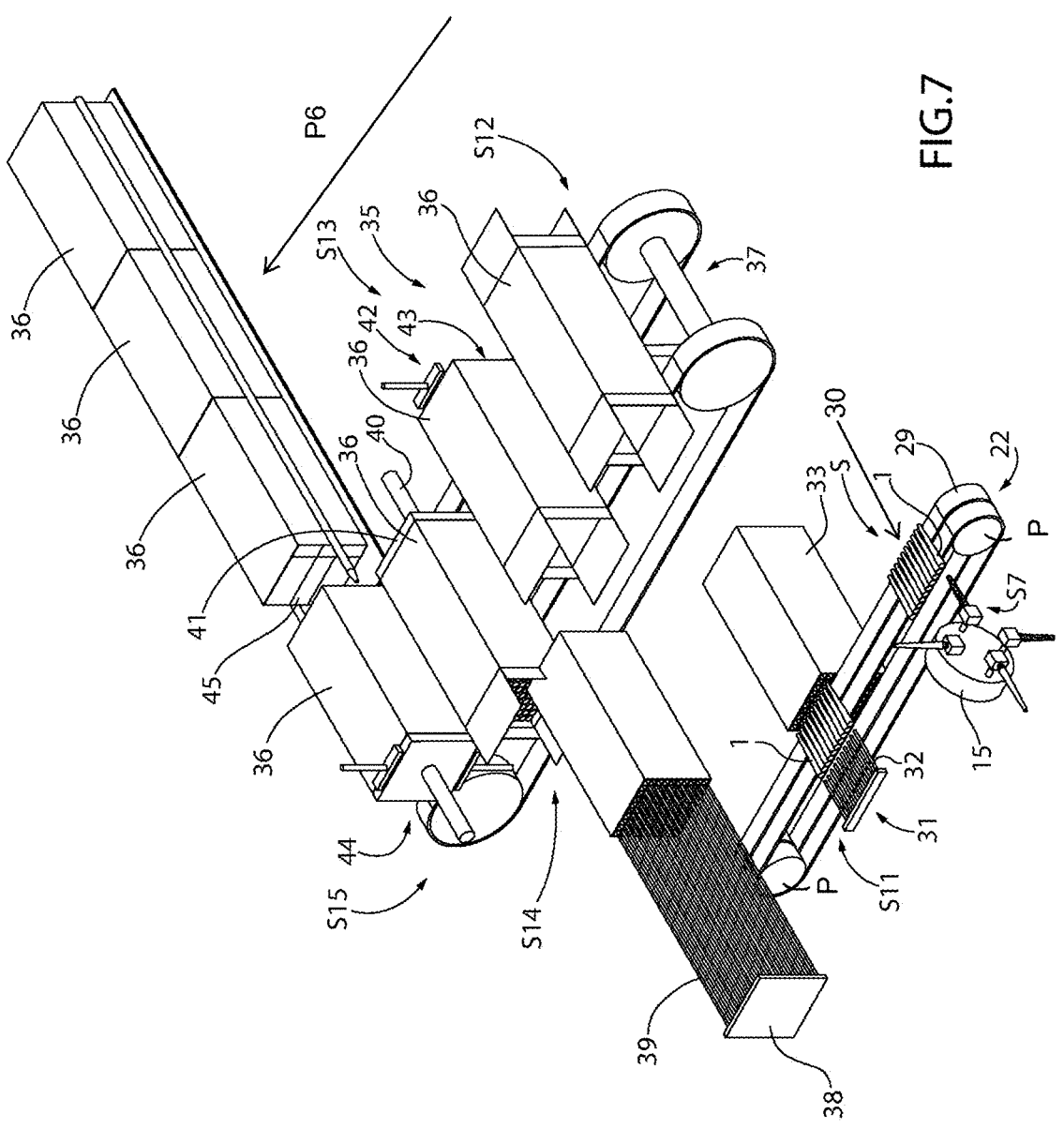
FIG. 7 is a perspective view with parts removed for clarity of a first embodiment of a second portion of the machine of FIG. 5.
Figure 8:
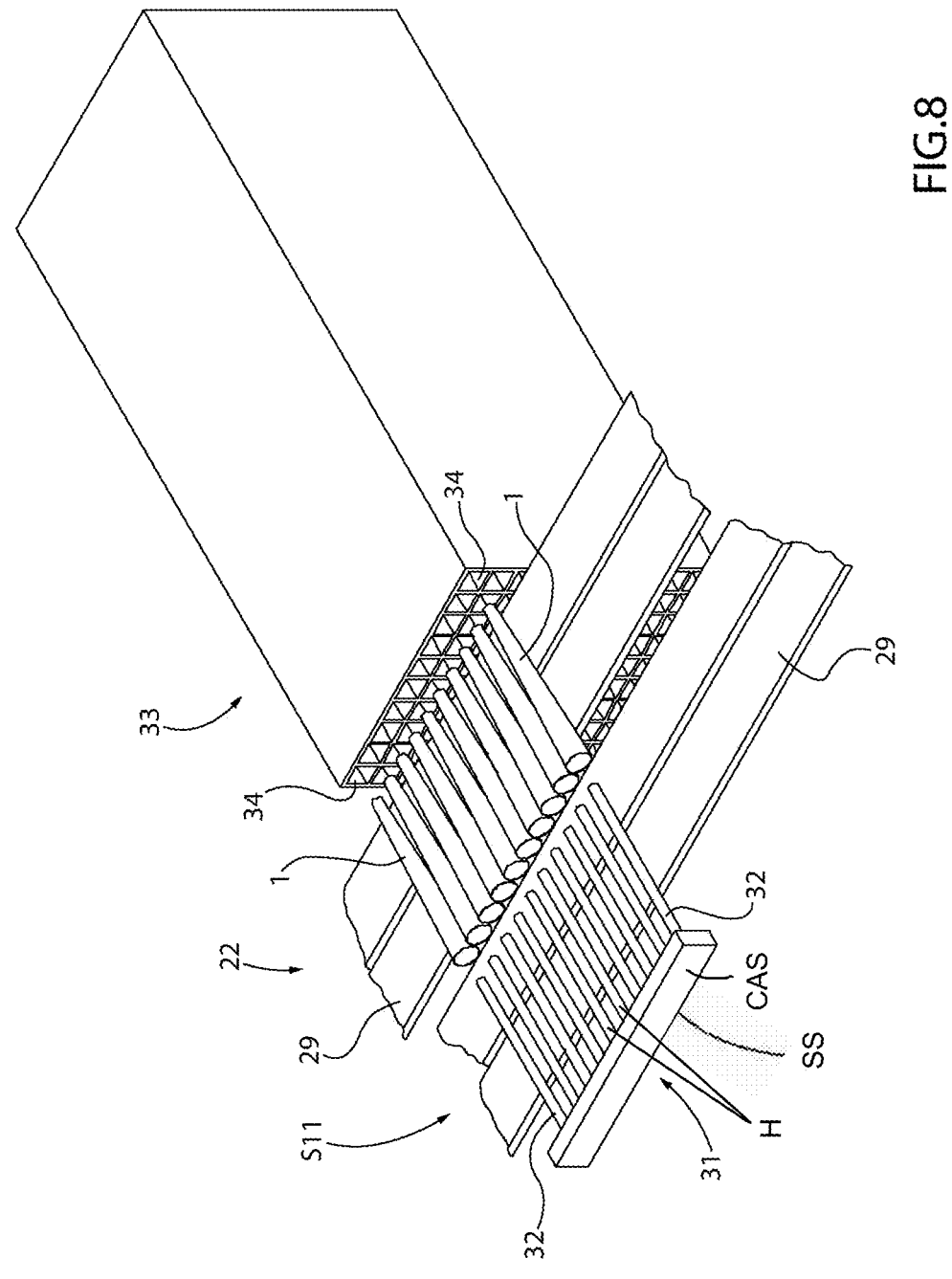
FIG. 8 is a perspective and enlarged view of an insertion station of FIG. 7.

As better illustrated in FIGS. 7 and 8, the transport conveyor 22 is defined by a belt conveyor and comprises a conveyor belt 29, which is closed in a loop around two end pulleys P.

A plurality of seats 30 are defined on the transport conveyor 22, each of which is designed to receive a corresponding tubular element 1; when a pocket 17 is stationary in the transfer station S7 and is in the expanded exchange position, said pocket 17 is facing a seat 30 of the transport conveyor 22 to release a respective tubular element 1 contained in the seat 18 of the pocket 17 inside the seat 30. More in detail, when the pocket 17 is at the seat 30, the small holes present on said pocket 17 are disconnected from the suction source that retains the tubular element 1 and are connected to the compressed air source, which also generates an axial thrust that facilitates extraction of the tubular element 1 from the pocket 17 and insertion inside the respective seat 30. According to a preferred variant, each seat 30 is open at the top and at both ends and is laterally delimited through a pair of appendages, which project from the conveyor belt 29.

The transport conveyor 22 moves with an intermittent movement, i.e., a non-continuous movement having a cyclic alternation of moving phases, in which the transport conveyor 22 is in movement, and stationary phases, in which the transport conveyor 22 stops.

The seats 30 are grouped in sets S; each set S has a number of seats 30 arranged beside one another. Preferably, all the sets S have the same number of seats 30. Each set S has ten seats 30 side by side. According to different embodiments, not illustrated, each set S is defined by a different number of seats 30, for example one, two, three, four, six, eight . . . seats 30.

The subsequent steps of the production process of the tubular elements 1 contained in the seats 30 of a same set S are carried out in parallel, i.e., they take place simultaneously for all the tubular elements 1 of a same set S.

In particular, once the seats 30 of a same set S have been filled with the respective tubular elements 1, the seats 30 of the set S are moved simultaneously by the transfer station S7 along the output path P4 to an insertion station S11.

An arm 31 having a plurality of pushing members 32 is provided at the insertion station S11. Preferably, the pushing members 32 are at least as many as the seats 30 of each set S. Each arm 31 having the plurality of pushing members 32 is arranged beside the transport conveyor 22. In particular, the arm 31 supports ten pushing members 32, each of which has the shape of the inner cavity of the tubular elements 1 and is designed to receive a corresponding tubular element 1. Each pushing member 32 is designed to retain a corresponding tubular element 1 by means of suction; i.e., an inner wall of each pushing member 32 has a plurality of small holes H which can be connected to a suction source SS to retain a corresponding tubular element 1. Moreover, each pushing member 32 can be connected to a compressed air source CAS to move a corresponding tubular element 1 away. According to a possible embodiment, the small holes H of each pushing member 32 are inclined towards the smaller base of the pushing member 32 (i.e., towards the narrower end of the pushing member 32); in this way, when the small holes H of each pushing member 32 are fed with compressed air they also generate an axial thrust which tends (helps) to extract the tubular element 1 from the pushing member 32.

The arm 31 is movable so as to translate, with respect to the transport conveyor 22, from a retracted position to an intermediate retrieving position, in which each pushing member 32 substantially overlaps the transport conveyor 22 and receives (retrieves) a corresponding tubular element 1 from the transport conveyor 22, and up to a forward position in which each member 32 delivers/feeds the respective tubular element 1 to a loader 33, and vice versa.

It is important to point out that all the pushing members 32 of the arm always translate together and in the same way, i.e., all the members 32 carry out the same movement synchronously. The movement of the arm 31 is generated by an actuator that preferably uses fixed cams and/or electric motors. When a pushing member 32 is in the intermediate retrieving position, the small holes present on said pushing member 32 are connected to the suction source SS to retain the tubular element 1 while, when the arm 31 is in the forward position the small holes H present on the pushing members 32 are disconnected from the suction source SS and are preferably connected to the compressed air source CAS, which also generates an axial thrust that facilitates extraction of the tubular element 1 from the respective pushing member 32 and insertion inside a respective seat 34 of the loader 33.

Figures 9, 10:
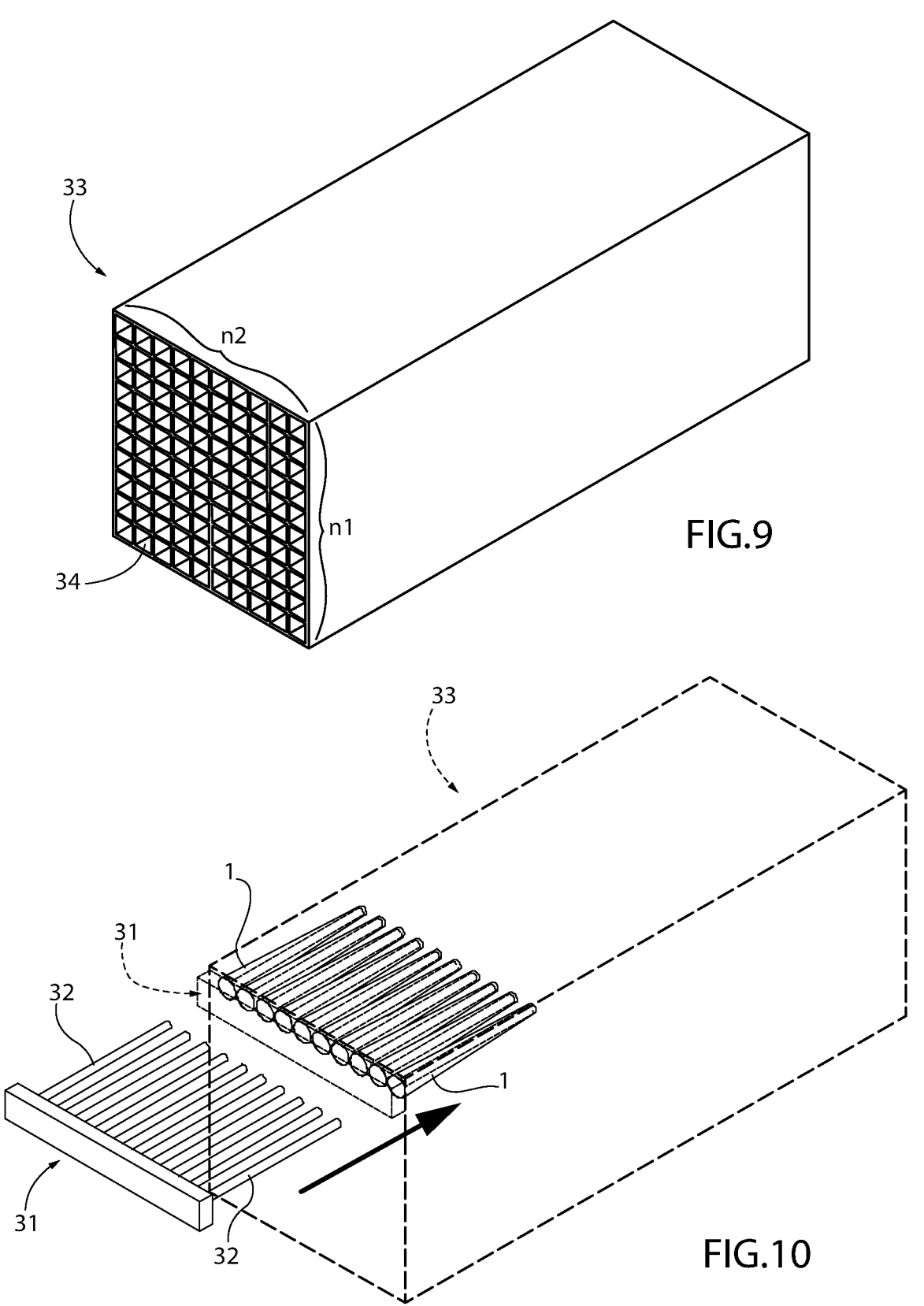
FIGS. 9, 10 and 11 are perspective views of a loader (empty, partially filled and completely filled) of FIG. 7.
Figure 11:
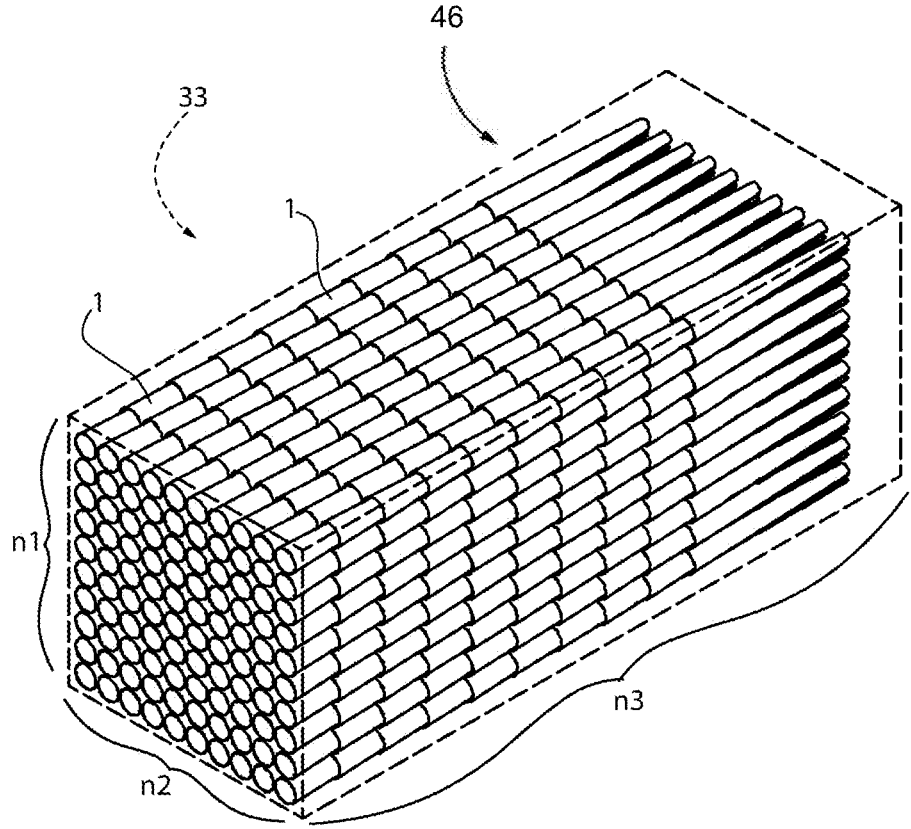

As illustrated in FIGS. 9 to 11, the loader 33 comprises a number of seats 34 with a substantially tubular shape, open at both ends (i.e., open at a front end facing the transport conveyor 22 and at a rear end) and divided into a number $n_1$ of lines of seats 34 beside one another and into a number $n_2$ of rows of overlapping seats 34. In particular, the number $n_2$ of lines of seats 34 is the same as the number of the pushing members 32 and, consequently, is the same as the number of the seats 30 of each set S.

Moreover, each seat 34 is designed to house, on the inside, a number $n_3$ of tubular elements 1 stacked one inside the other. For example, according to a first embodiment, the loader 33 comprises one hundred seats 34 divided into ten lines of seats 34 side by side and ten rows of seats 34 overlapped; moreover, each seat 34 is designed to house inside ten tubular elements 1 inserted one inside the other; in this way the loader 33 can contain internally a total of one thousand tubular elements 1. In accordance with an alternative embodiment, the loader 33 comprises a seat 34 (i.e., has a line and a column of seats 34) which can contain inside ten tubular elements 1 inserted one inside the other. It is understood that the number of lines and of columns of the loader 33, just as the number of tubular elements 1 that can be contained in each second seat 34, varies according to the pack to be produced.

The loader 33 is also arranged at the insertion station S11, beside the transport conveyor 22 and arranged on the side of the transport conveyor 22 opposite the side on which the arm 31 is arranged. The loader 33 is arranged so that the seats 34 of each line are time by time directly facing the seats 30 of the transport conveyor 22. Moreover, the loader 33 is movable to translate longitudinally (upwards and downwards) with respect to the transport conveyor 22.

When the manufacturing machine 1 is started up, the seats 34 of the first row (at the end of the loader 33) are directly facing the seats 30.

The arm 31 moves to arrange the pushing members 32 in the intermediate retrieving position, in which the small holes present on said pushing members 32 are connected to the suction source to retain the tubular element 1; the arm 31 is then activated again to be arranged in the forward position in which the small holes present on the pushing members 32 are disconnected from the suction source and are preferably connected to the compressed air source, which also generates an axial thrust that facilitates extraction of the tubular element 1 from the respective pushing member 32 and insertion inside the respective seat 34. The arm 31 moves back once again to the retracted position and the sequence of movements is repeated until $n_3$ tubular elements 1 are contained in each seat 34, stacked one inside the other. At each insertion of a tubular element 1, the axial thrust generated by the compressed air source allows, in addition to insertion of the tubular element 1 inside the respective seat 34, also translation of the semi-formed stack of elements 1 towards the bottom of the respective seat 34. It is specified that when the arm 31 is in the forward position, the pushing members 32 are inserted inside the seats 34 of the loader 33.

Once a row of seats 34 has been filled, the loader 33 is moved upwards so that the seats 34 of the subsequent row are arranged directly facing the seats 30 for filling with the tubular elements 1. These operations are repeated until all the seats 34 of the loader 33 have been filled.

Figure 12:
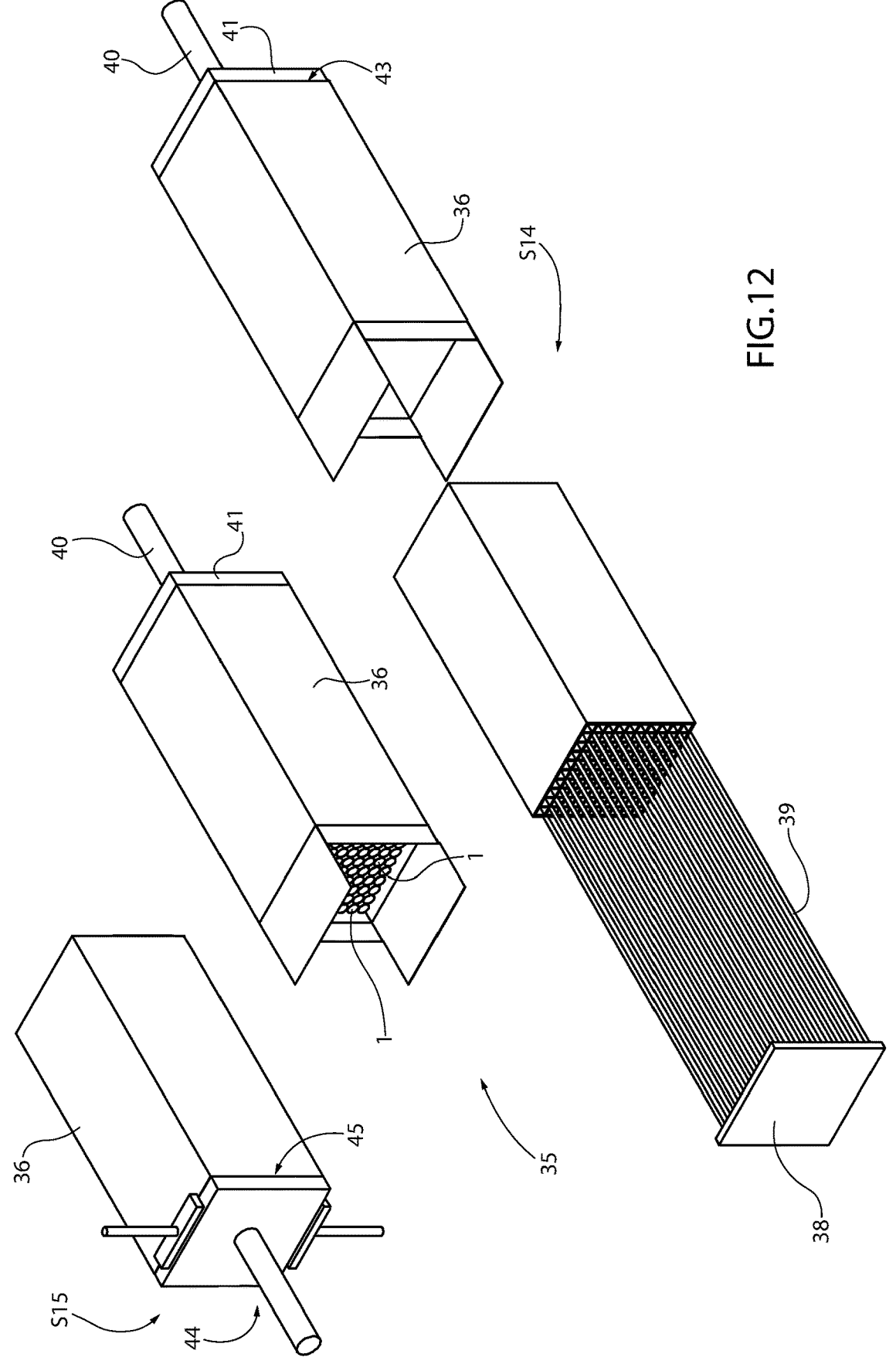
FIG. 12 is a perspective view with parts removed for clarity of a cartoning unit of FIG. 7.

As illustrated in FIGS. 7 and 12, the manufacturing machine 1 also comprises a cartoning unit 35 in which a blank, flattened and formed by two portions or sheets of cardboard, overlapped and connected at the longitudinal fold edges, is developed into a parallelepiped shape, so as to obtain a tubular pack 36. More in particular, the blank is opened so as to give it a three-dimensional and tubular outline open at its opposite ends. This operation precedes insertion of the tubular elements 1 present inside a loader 33 inside the tubular pack 36, which are transferred as described in the description below. The cartoning unit 35 moves the tubular packs 36 along a packing path P6.

More in detail, the cartoning unit 35 comprises a packing conveyor 37 defined by a belt conveyor and comprising two conveyor belts side by side which are closed in a loop around two end pulleys. The packing path P6 that extends along the packing conveyor 37 is provided, in succession, with a feeding station S12 for feeding the empty tubular packs 36; a closing station S13 for closing a first end of the empty tubular packs 36 in which a closing device 42 (of known type and not described in detail) folds and glues the flaps of the tubular pack 36 defining a bottom wall 43 of said tubular pack 36; an insertion station S14 of the tubular elements 1 which are transferred from the loader 33 to the tubular pack 36; and finally a closing station S15 for closing a second end of the tubular packs 36 in which a closing device 44 (of known type and not described in detail) folds and glues the flaps of the tubular pack 36 defining a front wall 45 of said tubular pack 36.

In the insertion station S14 of the tubular elements 1, the loader 33 containing the tubular elements is fed in the area of a tubular pack 36; in particular, the loader 33 is arranged facing the open end of the tubular pack 36.

The insertion station S14 comprises an arm 38 having a plurality of pushing members 39, preferably at least as many as the seats 34 of the loader 33 and beside the packing conveyor 37. In particular, in accordance with the embodiment illustrated in FIG. 12, the arm 38 is provided with one hundred pushing members 39. As illustrated in FIG. 12, the arm 38 is arranged facing the end of the loader 33 opposite the end facing the open end of the tubular pack 36. In other words, the loader 33 is interposed between the arm 38 and the tubular pack 36. Each pushing member 39 has a tubular shape and has a free end having the shape of the inner cavity of the tubular elements 1 and designed to receive a corresponding leading tubular element 1 (i.e., the tubular element directly facing the pushing member 39). Each pushing member 39 is designed to accompany the insertion of a corresponding stack of tubular elements 1 inside the tubular pack 36. Preferably, an inner wall of each free end of the pushing members 39 has a plurality of small holes which can be connected to a suction source to retain the corresponding leading tubular element 1 and can preferably be connected to a compressed air source to move the corresponding leading tubular element 1 away. According to a possible embodiment, the small holes of each member are inclined towards the smaller base of the pushing member 39 (i.e., towards the narrower end of the pushing member 39); in this way, when the small holes of each pushing member 39 are supplied with compressed air they also generate an axial thrust that tends (helps) to extract the leading tubular element 1 (and, consequently, the whole stack of tubular elements 1).

The arm 38 is movable so as to translate from a retracted position to an intermediate retrieving position, in which each pushing member 39 receives/retrieves a corresponding stack of tubular elements 1 from the loader 33 and up to a forward position in which each pushing member 39 transfers the respective stack of tubular elements 1 to the tubular pack 36, and vice versa.

It is important to point out that all the members 39 of the arm 38 always translate together and in the same way, i.e., all the members 39 carry out the same translation synchronously. The movement of the arm 38 is generated by an actuator that preferably uses fixed cams and/or electric motors. When a pushing member 39 is in the intermediate retrieving position, the small holes present on said pushing members 39 are connected to the suction source to retain the leading tubular element 1 of the stack while, when the arm 38 is in the forward position the small holes present on the pushing members 39 are disconnected from the suction source and are preferably connected to the compressed air source which also generates an axial thrust that facilitates extraction of the leading tubular element 1 (and, consequently, of the whole stack) from the respective pushing member 39 and insertion inside the tubular pack 36.

The insertion station S14 further comprises an arm 40 arranged beside the packing conveyor 37. In particular, the arm 40 is provided with a plate 41 which is arranged facing the bottom wall 43 of the tubular pack 36. In other words, the tubular pack 36 is interposed between the loader 33 and the arm 40.

The arm 40 is movable so as to translate, with respect to the packing conveyor 37, from a retracted position to a forward position in which the loader 33 is at least partially inserted inside the tubular pack 36, and vice versa. According to a preferred variant, in the forward position the loader 33 is inserted completely inside the tubular pack 36 so that the bottom wall 43 closes the seats 34 of the loader 33 at the rear. The movement of the arm 40 is generated by an actuator that preferably uses fixed cams and/or electric motors.

In use, when the loader 33 is in the area of the insertion station S14, the arm 40 that is in the retracted position is started up so as to move to the forward position in which the loader 33 is at least partially inserted (preferably, completely inserted) inside the tubular pack 36. Subsequently, the arm 38 is also activated, first towards the intermediate position and then towards the forward position; simultaneously, the arm 40 that is in the forward position is started up so as to translate to the retracted position in which the pushing members 39 are inserted completely inside the seats 34 and the stack of tubular elements 1 have been transferred inside the tubular pack 36. It is important to point out that during transfer of the tubular elements 1 from the loader 33 to the tubular pack 36, the loader 33 remains stationary while the arm 38 and the tubular pack 36 move. Moreover, it is also important to point out that the movement of the tubular pack 36 allows the bottom wall 43 to support the stack of tubular elements 1.

According to an alternative embodiment (not illustrated), the tubular pack 36 is provided with a double bottom; in other words, an intermediate wall is housed inside the tubular pack 36, parallel to the bottom wall 43 and provided with a plurality of through openings, as many in number as the stack of tubular elements 1. During transfer inside the tubular pack 36, each stack of tubular elements 1 is inserted inside a respective through opening until contacting the bottom wall 43.

According to an alternative embodiment (not illustrated), the linear transport conveyor 22 receives the tubular elements 1 provided with the filters 2 from a tray or from a magazine and moves the tubular elements 1 provided with the filters 2 along the linear output path P4. In particular, the tray is produced so as to accommodate internally a number of tubular elements 1 provided with the filters 2 which are transferred inside the seats 30.

Operation of the manufacturing machine 8 with reference to the manufacture of a single tubular element 1 is described below.

As illustrated in FIGS. 5 and 6, a truncate-cone shaped wrapping sheet 3 is accompanied above a pocket 11 that is located in the feeding station S1. Each pocket 11 reaches the feeding station S1 when it is in the lowered movement position (i.e., axially closest to the input drum 9) and once it has reached the feeding station S1 the pocket 11 translates axially from the lowered movement position to the raised exchange position (i.e., axially farthest from the input drum 9). Once the pocket 11 has received the wrapping sheet 3, said pocket 11 translates axially from the raised exchange position to the lowered movement position and only once it has reached the lowered movement position can it rotate again together with the input drum 9 around the rotation axis 10 to move along the input path P1.

Once the pocket 11 has received the wrapping sheet 3 in the feeding station S1, rotation of the input drum 9 around the rotation axis 10 takes the pocket 11 to pass through (always moving) the gumming station S2 (i.e., without ever stopping in the gumming station S2), in which glue is deposited on an edge of the wrapping sheet 3; as stated previously, while passing through the gumming station S2 the pocket 11 rotates with respect to the input drum 9 and around the rotation axis 14 so that the glue sprayed is deposited in the desired position along an edge of the wrapping sheet 3.

Once the pocket 11 has passed through the gumming station S2, rotation of the input drum 9 around the rotation axis 10 carries the pocket 11 into the transfer station S3 in which the pocket 11 stops; simultaneously, rotation of the wrapping drum 12 around the rotation axis 13 carries a spindle 14 into the transfer station S3 and above the pocket 11 that is still in the lowered movement position (i.e., axially closest to the input drum 9). At this point, the pocket 11 translates axially from the lowered movement position to the raised exchange position (i.e., axially farthest from the input drum 9) to carry the wrapping sheet 3 into contact with the spindle 14. In this step, the pocket 11 transfers the wrapping sheet 3 by interrupting its suction (which could also become a jet of air to move the wrapping sheet 3 away from the pocket 11) while simultaneously the spindle 14 captures the wrapping sheet 3 by activating its suction.

Once production of the tubular element 1 has been completed (i.e., once a tube of the wrapping sheet 3 has been wound around the spindle 14), rotation of the wrapping drum 12 around the rotation axis 13 moves the spindle 14 carrying the tubular element 1 (i.e., the wrapping sheet 3 folded into a tube) through the two stabilizing stations S4, in which the spindle 14 stops and the glue (which can be heated if necessary) is able to take sufficient hold, stabilizing the shape of the tubular element 1.

Subsequently, the rotation of the wrapping drum 12 around the rotation axis 13 moves the spindle 14 taking the tubular element 1 from the second stabilizing station S4 to the transfer station S5. At this point, a pocket 17 of the insertion drum 15 which has reached the transfer station S5 together with the spindle 14 and is in the movement position, translates radially with respect to the insertion drum 15 from the contracted movement position to the expanded exchange position to internally incorporate the tubular element 1 carried by the spindle 14, i.e., to insert the tubular element 1 carried by the spindle 14 into its central seat 18; at this point, the spindle 14 transfers the tubular element 1 interrupting its suction (which could also become a jet of air to move the tubular element 1 away from the spindle 14) while the pocket 17 simultaneously captures the tubular element 1 activating its suction. Finally, the pocket 17 of the insertion drum 15 translates radially with respect to the insertion drum 15 from the expanded exchange position to the contracted movement position to extract the tubular element 1 (retained by suction inside the seat 18 of the pocket 17) from the spindle 14.

Once the pocket 17 has retrieved the tubular element 1 from the spindle 14 in the transfer station S5, the rotation of the insertion drum 15 around the rotation axis 16 moves the pocket 17 inside the insertion station S6 in which the pocket 17 is stationary. When the pocket 17 is stopped in the insertion station S6, said pocket 17 (which is in the movement position) translates radially with respect to the insertion drum 15 from the contracted movement position to the expanded exchange position to couple with the insertion body 20; in this way, the insertion body 20 enters the seat 18 of the pocket 17 and consequently enters the tubular element 1 housed in the seat 18. Simultaneously, the pusher 21 rotates and pushes a filter 2 along the whole of the insertion body 20 until the filter 2 exits from the narrower (smaller) output end of the insertion body 20 and consequently (stably) positions the filter 2 inside the tubular element 1 through interference. When insertion of the filter 2 inside the tubular element 1 has been completed, the pocket 17 of the insertion drum 15 translates radially with respect to the insertion drum 15 from the expanded exchange position to the contracted movement position to extract the tubular element 1 from the insertion body 20.

Once the pocket 17 of the insertion drum 15 has returned to the contracted movement position, rotation of the insertion drum 15 around the rotation axis 16 moves the pocket 17 from the insertion station S6 to the transfer station S7 in which the pocket 17 stops. When the pocket 17 is stationary in the transfer station S7, said pocket 17 (which is in the movement position) translates radially with respect to the insertion drum 15 from the contracted movement position to the expanded exchange position in which the pocket 17 is exactly above the transport conveyor 22); the pocket 17 transfers the tubular element 1 inside the seat 30 of the transport conveyor 22 interrupting its suction (which could also become a jet of air to move the tubular element 1 away from the pocket 17).

When the seats 30 of a set S have all been filled with the respective tubular elements 1, said seats 30 are moved to the area of insertion station S11, so as to be interposed between the arm 30 and the loader 33.

The arm 31 is then activated to arrange the pushing members 32 in the intermediate retrieving position, in which the small holes present on said pushing members 32 are connected to the suction source to retain the respective tubular elements 1; the arm 31 is then once again activated until it is arranged in the forward position in which the small holes present on the pushing members 32 are disconnected from the suction source and are connected to the compressed air source to allow extraction of the tubular element 1 from the respective pushing member 32 and insertion inside the respective seat 34. The arm 31 once again moves back to the retracted position and the sequence of movements is repeated until a number $n_3$ of tubular elements 1 stacked one inside the other are contained inside each seat 34.

Once the loader 33 has been filled, the latter is transported to the area of the insertion station S14, interposed between the tubular pack 36 and the arm 38. Firstly, the arm 40 that is in the retracted position is started up so as to move up to the forward position in which the loader 33 is at least partially inserted inside the tubular pack 36. Subsequently, the arm 38 is also activated, which starts to move towards the intermediate position and then towards the forward position; simultaneously, the arm 40 that is in the forward position starts to translate up to the position in which the pushing members 39 are inserted completely inside the seats 34 and the stacks of tubular elements 1 have been completely transferred inside the tubular pack 36.

According to an embodiment, the tubular element 1 has no filter 2, i.e., no filter 2 is inserted inside the tubular element 1.

In the embodiment illustrated in the accompanying figures, the pockets 11, 17 and 25 and the spindles 14 are moved forwards along the respective paths P1, P2, P3 and P5 by rotary conveyors (the drums 9, 12, 15 and 23); according to a different embodiment, not illustrated, some or all the rotary conveyors (the drums 9, 12, 15 and 23) that move the pockets 11, 17 and 25 and the spindles 14 are replaced by corresponding linear conveyors (and consequently the respective paths P1, P2, P3 and P5 are no longer circular but linear).

According to a further embodiment, each stack of $n_3$ tubular elements 1 is provided with a substantially cylindrical tubular element or straw 46 arranged at one end to make said stacks more manageable. In the description below, for convenience said tubular element will be indicated as straw 46. In the case in which the tubular elements 1 are provided with the filter 2, clearly, the straw 46 extends up to the first filter 2 of the respective stack of $n_3$ tubular elements 1. The straws 2 are preferably made of coated card (or of a simple paper material).

Figure 13:
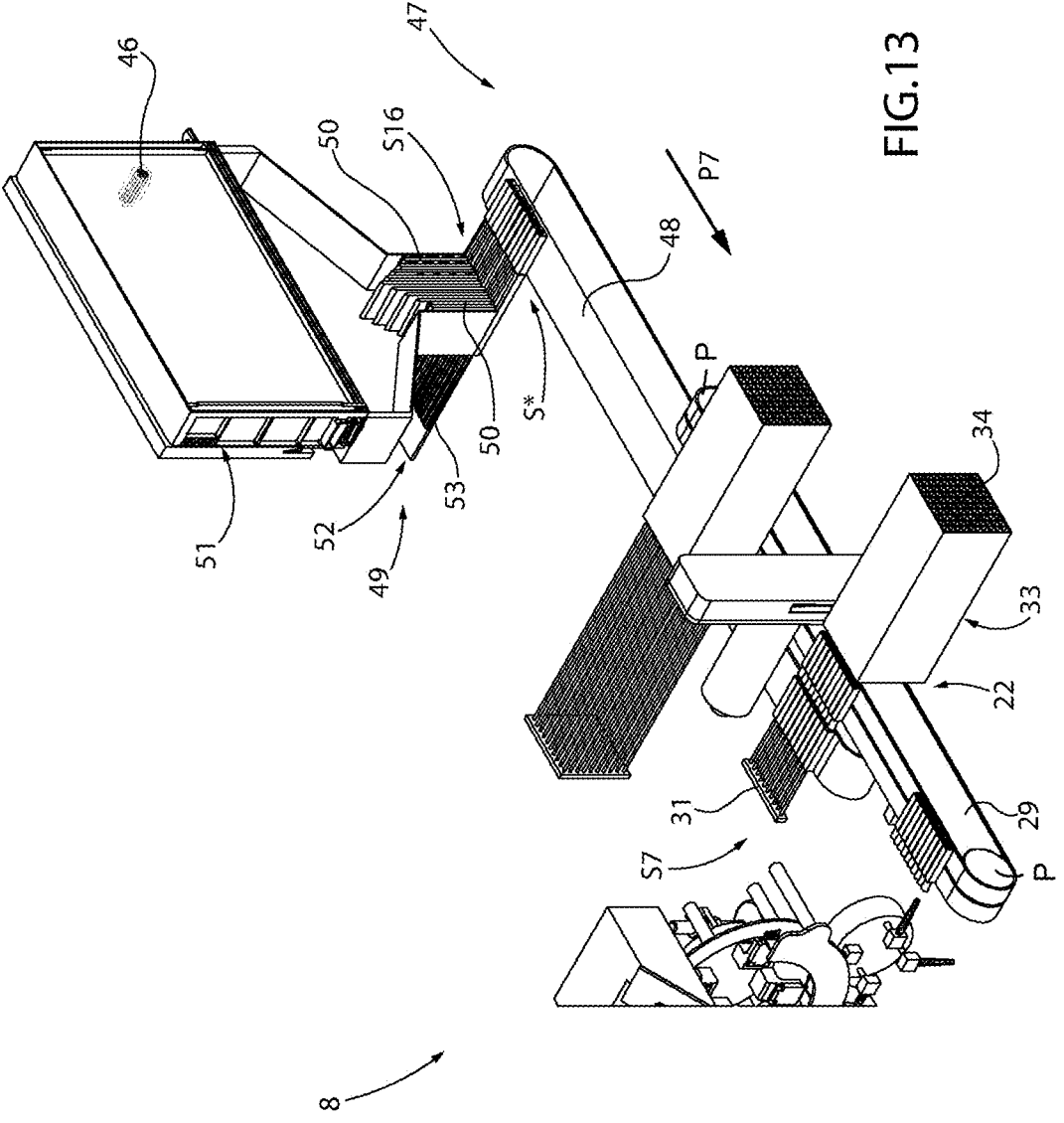
FIG. 13 is a perspective view with parts removed for clarity of a second embodiment of a second portion of the machine of FIG. 5.
Figure 14:
FIG. 14 is a perspective and enlarged view of a portion of the machine of FIG. 13.

As illustrated in FIGS. 13 and 14, the manufacturing machine 8 comprises a linear transport conveyor 47 that receives the straws 46 in the area of a feeding station S16 and moves the straws 46 along a linear feed path P7. The transport conveyor 47 is defined by a belt conveyor and comprises a conveyor belt 48, which is closed in a loop around two end pulleys.

On the transport conveyor 47 there are defined a plurality of seats, each of which is designed to receive a corresponding straw 46. The transport conveyor 47 moves with an intermittent movement, i.e., a non-continuous movement having a cyclic alternation of moving phases, in which the transport conveyor 47 is in movement, and of stationary phases, in which the transport conveyor 47 stops.

The seats of the transport conveyor 47 are grouped in sets S*; each set S* has a number of seats arranged beside one another. Preferably, all the sets S* have the same number of seats. Each set S* has ten seats side by side. According to different embodiments, not illustrated, each set S* is defined by a different number of seats, for example one, two, three, four, six, eight . . . seats. It is important to point out that each set S* has the same number of seats 30 as the sets S.

The feeding station S16 comprises a hopper 49 for straws 46 that extends vertically and comprises a number of output mouths 50 from which the assemblies of straws 46 are extracted one after the other by means of the corresponding extraction device. Each extraction device is coupled with a corresponding output mouth 50 and is designed to cyclically extract an assembly of straws 46 from the output mouth 50 to allow the assembly of straws 46 to be inserted inside a corresponding seat of the transport conveyor 47 stationary in front of the output mouth 50 as better described in the description below. Preferably, the hopper 49 comprises ten output mouths 50. According to different embodiments, not illustrated, the hopper 49 comprises a different number of output mouths 50, for example one, two, three, four, six, eight . . . output mouths 50. It is important to point out that the number of output mouths 50 corresponds to the number of seats of each set S* and to the number of seats 30 of the sets S.

The hopper 49 comprises an upper part and a lower part, which are both delimited at the front and at the rear by respective vertical walls. The lower part of the hopper 49 comprises the output mouths 50, preferably spaced equidistant from one another, which are divided internally by a plurality of walls or baffles defining channels inside which the straws 46 are arranged in substantially vertical stacks.

The upper part of the hopper defines an upper input for the straws 46 that are preferably fed by means of trays 51 (alternatively, the straws 46 can be fed manually or by means of conveying systems) and are collected in a free chamber arranged immediately above the output mouths 50. The straws 46 travel through the hopper 49 descending by gravity from the top to the bottom. According to a possible embodiment, diverter elements that define descent paths of the straws 46 towards the output mouths 50 can be provided inside the chamber.

An arm 52 having a plurality of pushing members 53 is provided at the feeding station S16. Preferably, the pushing members 53 are at least as many as the seats of each set S*. The arm 52 is arranged beside the transport conveyor 47, with interposition of the output mouths 50. In particular, the arm 52 supports ten pushing members 53, each of which is designed to receive a corresponding straw 46.

Each pushing member 53 is designed to retain a corresponding straw 46, preferably by means of suction; i.e., an inner wall of each pushing member 53 has a plurality of small holes, which can be connected to a suction source to retain a corresponding straw 46. Moreover, each pushing member 53 can be connected to a compressed air source in order to move a corresponding straw 46 away. The arm 52 is movable to translate, with respect to the transport conveyor 47, from a retracted position to an intermediate retrieving position, in which each pushing member 53 receives (retrieves) a corresponding straw 46 from the respective output mouth 50 and up to a forward position in which each member 53 delivers/feeds the respective straw to the transport conveyor 47, and vice versa.

It is important to point out that all the pushing members 53 of the arm always translate together and in the same way, i.e., all the members 53 carry out the same movement synchronously. The movement of the arm 52 is generated by an actuator that preferably uses fixed cams and/or electric motors. When a pushing member 53 is in the intermediate retrieving position, the small holes present on said pushing member 53 are connected to the suction source to retain the straw 46 while, when the arm 52 is in the forward position the small holes present on the pushing members 53 are disconnected from the suction source and are preferably connected to the compressed air source, which also generates an axial thrust that facilitates extraction of the straw 46 and insertion inside a respective seat of the transport conveyor 47.

The subsequent steps of the production process are carried out in parallel, i.e., they take place simultaneously for all the straws 46 of a same set S*. In particular, once the seats of a same set S* have been filled with the respective straws 46, the seats of the set S* are moved simultaneously by the feeding station S16 along the linear feed path P7 and up to the insertion station S11. At the insertion station S11, the transport conveyor 47 is arranged between the arm 31 and the transport conveyor 22.

Insertion of $(n_3-1)$ tubular elements 1 of each stack inside the seats 34 takes place as described above. Before insertion of the last tubular element 1 of each stack inside the respective seat 34, the seats of the set S* are moved simultaneously to the insertion station S11 so that each seat of the transport conveyor 47 is directly facing a corresponding seat 30 of the transport conveyor 22.

In this way, when the arm 31 moves to arrange the pushing members 32 in the intermediate retrieving position, in which the small holes present on said pushing members 32 are connected to the suction source, each pushing member 32 is designed to retain the tubular element 1 and the corresponding straw 46; the arm 31 is then activated again until it is arranged in the forward position in which the small holes present on the pushing members 32 are disconnected from the suction source and are preferably connected to the compressed air source, which also generates an axial thrust that facilitates extraction of the tubular element 1 and of the respective straw 46 from the respective pushing member 32 and insertion inside the respective seat 34.

In the embodiment illustrated in the accompanying figures, the loader 33 contains one thousand tubular elements 1 divided into ten lines and ten rows of seats 34, each of which is produced to house ten tubular elements 1 but according to a different embodiment, not illustrated, the loader 33 can contain any number of tubular elements 1.

In the embodiment illustrated in the accompanying figures, the tubular element 1 is designed to produce a cigarette manually; according to a different embodiment, the tubular element 1 (naturally without the filter 2 and truncated-cone shaped or cylindrical) has a different final destination, for example it could form a drinking straw (i.e., a straw for sipping a beverage). Naturally, to produce a drinking straw the wrapping sheet 3 must be made of paper that has been made sufficiently waterproof or of another waterproof material.

The manufacturing machine 8 described above has numerous advantages. Firstly, with the manufacturing machine 8 described above it is possible to reach high hourly production speeds while ensuring a high quality standard (i.e., ensuring the formation of tubular elements 1 of perfect shape without crushing or more or less significant deformations). Moreover, the manufacturing machine 8 is relatively simple and inexpensive to produce.

LIST OF REFERENCE NUMBERS OF THE
FIGURES 1 tubular element
2 filter
3 wrapping sheet
4 cardboard sheet
5 inner portion
6 outer portion
7 pre-creased fold lines
8 manufacturing machine
9 input drum
10 rotation axis
11 pockets
12 wrapping drum
13 rotation axis
14 spindles
15 insertion drum
16 rotation axis
17 pockets
18 seat
19 insertion device
20 insertion body
21 pusher
22 transport conveyor
23 folding drum
24 rotation axis
25 pockets
26 movable folding element
27 fixed stop
28 movable folding element
29 conveyor belt
P pulley
30 seat
31 arm
32 pushing member
33 loader
34 seat
35 cartoning unit
36 tubular pack
37 packing conveyor
38 arm
39 pushing member
40 arm
41 plate
42 closing device
43 bottom wall
44 closing device
45 upper wall
46 straw
47 transport conveyor
48 conveyor belt
49 hopper
50 output mouth
51 tray
52 arm
53 pushing member
p1 input path
p2 wrapping path
p3 insertion path
p4 output path
p5 folding path
p6 packing path
p7 feed path
S1 feeding station
S2 gumming station
S3 transfer station S4 stabilizing station
S5 transfer station
S6 insertion station
S7 transfer station
S8 feeding station
S9 folding station
S10 folding station
S11 insertion station
S12 pack feeding station
S13 closing station
S14 tubular element insertion station
S15 closing station
S16 feeding station
S set
S* set
SS suction source
CAS compressed air source
H hole

The invention claimed is:

1. A manufacturing machine (8) for manufacturing tubular elements with the shape of a truncated-cone, provided, at an end, with a filter (2); the manufacturing machine (8) comprising:

a first transport conveyor (22), which is provided with a number of first seats (30), each designed to receive a respective tubular element (1), which feeds the first seats along a conveying path and in which the first seats (30) are divided into first sets (S), each comprising a predetermined number of the first seats (30);

a loader (33) having a plurality of second seats (34), wherein each of the second seats (34) is designed to house, on an inside, a first number (n3) of the tubular elements (1) stacked one inside the other to form a row of the tubular elements (1);

first insertion station (S11), arranged along the conveying path and in which the tubular elements (1) housed inside the first seats (30) of one of the first set (S) are simultaneously transferred inside the respective second seats (34);

a packing conveyor (37), which moves tubular packs (36) along a packing path (P6);

a second insertion station (S14), arranged along the packing path (P6) in which the row of the tubular elements (1) contained in each of the second seats (34) is transferred from the loader (33) to the tubular pack (36); and wherein the loader (33) is movable from the first insertion station (11) arranged along the conveying path to the second insertion station (S14) arranged along the packing path (P6).

2. The machine according to claim 1, wherein said first sets (S) each comprise the same number of the first seats (30).

3. The machine according to claim 2 and comprising a first arm (31), which has a plurality of first pushing members (32), at least as many as the first seats (30) of each of the first sets (S), and is beside the first transport conveyor (22); wherein each of the first pushing member (32) has the shape of the inner cavity of the tubular elements (1) and is designed to receive a corresponding tubular element (1).

4. The machine according to claim 3, wherein each of the first pushing members (32) has a plurality of small holes connected to a suction source in order to retain the tubular element (1).

5. The machine according to claim 3, wherein the loader (33) is beside the first transport conveyor (22), on the side of the first transport conveyor (22) opposite that of the first arm (31); and the first arm (31) is movable so as to translate from a retracted position to an intermediate retrieving position, in which each of the first pushing members (32) substantially overlaps the first transport conveyor (22) and receives a corresponding tubular element (1), and up to a forward position, in which each of the first pushing members (32) delivers the respective tubular element (1) to the respective second seat (34) of the loader (33), and vice versa.

6. The machine according to claim 1, wherein the loader (33) comprises a number of the second seats (34) with a substantially tubular shape, which are open at both ends and are divided into a first number (n1) of lines of the second seats (34) beside one another and into a second number (n2) of lines of the second seats (34) on top of one another.

7. The machine according to claim 6, wherein the loader (33) is longitudinally movable so that the second seats (34) of each line are facing the first arm (31).

8. The machine according to claim 1, wherein the first transport conveyor (22) is defined by a conveyor belt and comprises a belt (29), which is closed in a loop around two end pulleys.

9. The machine according to claim 1 and comprising a second transport conveyor (47), which is provided with a number of third seats, each designed to receive a respective one of straws (46), and moves said third seats along a feeding path (P7) and in which said third seats are divided into second sets (S*), each comprising a predetermined number of the third seats.

10. The machine according to claim 9, wherein the second transport conveyor (47) is defined by a conveyor belt and comprises a belt (48), which is closed in a loop around two end pulleys.

11. The machine according to claim 9 and comprising a feeding station (S16) for feeding the straws (46), arranged along the feeding path (P7) and comprising a hopper (49) provided with a number of output mouths (50), from which the straws (46) are extracted one after the other and inserted inside a corresponding one of the third seats of the second transport conveyor (47).

12. The machine according to claim 9 and comprising a second arm (52), which has a plurality of second pushing members (53), at least as many as the third seats of each of the second set (S*) and is beside the second transport conveyor (47).

13. The machine according to claim 9 wherein the second transport conveyor (47) is designed to feed said straws (46) along the feeding path (P7) from a feeding station (S16) for feeding the straws (46) to the insertion station (S11).

14. The machine according to claim 13, wherein, in the area of the first insertion station (S11), the second transport conveyor (47) is interposed between the first arm (31) and the first transport conveyor (22).

15. The machine according to claim 1 and comprising: a feeding station (S12) for feeding the tubular packs (36) and a first closing station (S13) for closing a first end of the tubular packs (36), arranged along the packing path (P6) upstream of the second insertion station (S14); a second closing station (S15) for closing a second end of the tubular packs (36), arranged along the packing path (P6) downstream of the second insertion station (S14).

16. The machine according to claim 15, wherein the second insertion station (S14) comprises a third arm (38), which has a plurality of third pushing members (39), and is arranged beside the packing conveyor (37); wherein the third arm (38) is movable so as to translate from a retracted position to an intermediate retrieving position, in which each of the third pushing members (39) receives a corresponding row of the tubular elements (1) from the loader (33), and up to a forward position, in which each of the third pushing members (39) delivers the row of the tubular elements (1) to the tubular pack (36), and vice versa.

17. The machine according to claim 16, wherein each of the third members (39) has a tubular shape and has an end defining a seat designed to receive the leading tubular element (1).

18. The machine according to claim 1, wherein the second insertion station (S14) comprises a fourth arm (40) arranged beside the packing conveyor (37) and facing a bottom wall of the tubular pack (36); the fourth arm (40) is designed movable so as to translate from a retracted position to a forward position, in which the loader (33) is at least partially inserted inside the tubular pack (36), and vice versa.

19. The machine according to claim 1 and comprising:

an input conveyor (9), which moves, along an input path (P1), at least one first pocket (11) which receives a wrapping sheet (3);

a wrapping conveyor (12), which moves, along a wrapping path (P2), at least one spindle (14) having the shape of an inner cavity of the tubular elements (1) in which the first pocket (11) transfers the wrapping sheet (3) to the spindle (14) folding the wrapping sheet (3) around the spindle (14), and an insertion conveyor (15), which moves, along an insertion path (P3) at least one second pocket (17) having a tubular shape, which reproduces in negative the shape of the tubular elements (1) and is designed to receive the tubular elements (1) from the spindle (14), and in which the filter (2) in inserted inside the tubular elements (1) housed in the second pocket (17);

wherein the first transport conveyor (22) is arranged so as to receive, in the area of the first seats (30), the tubular elements (1) from the insertion conveyor (15).

20. A manufacturing method for manufacturing truncated-cone shaped tubular elements (1), provided, at an end, with a filter (2); the method comprising:

feeding the tubular elements (1) to a first transport conveyor (22);

moving, by means of the first transport conveyor (22), the tubular elements (1) grouped in sets (S) along a conveying path (P4);

simultaneously transferring the tubular elements (1) of the sets (S) from the first transport conveyor (22) to a loader (33) in first insertion station (S11) arranged along the conveying path;

stacking, one inside the other, a first number (n3) of the tubular elements, so as to form rows of tubular elements (1) inside the loader (33);

moving, by means of a packing conveyor (37), tubular packs (36) to second insertion station (S14) arranged along a packing path (P6);

transferring the loader (33) from the first insertion station (S11) arranged along the output path to the second insertion station (S14) arranged along the packing path (P6); and transferring the tubular elements (1) from the loader (33) inside a tubular pack (36) in the second insertion station (S14) arranged along the packing path (P6).

* * * * *